(No Model.)
2 Sheets—Sheet 1.

T. R. CRANE.
HARROW.

No. 381,464. Patented Apr. 17, 1888.

WITNESSES:
R. L. Clemmitt
John E. Morris

INVENTOR:
Thos R. Crane

BY Chas B. Mann
ATTORNEY.

(No Model.) 2 Sheets—Sheet 2.

T. R. CRANE.
HARROW.

No. 381,464. Patented Apr. 17, 1888.

WITNESSES:
R. L. Clemmitt.
John E. Morris

INVENTOR:
Thos R. Crane

BY Chas B. Mann
ATTORNEY.

UNITED STATES PATENT OFFICE.

THOMAS R. CRANE, OF HEATHSVILLE, VIRGINIA.

HARROW.

SPECIFICATION forming part of Letters Patent No. 381,464, dated April 17, 1888.

Application filed November 16, 1887. Serial No. 255,303. (No model.)

*To all whom it may concern:*

Be it known that I, THOMAS R. CRANE, a citizen of the United States, residing at Heathsville, in the county of Northumberland and State of Virginia, have invented certain new and useful Improvements in Harrows, of which the following is a specification.

This invention relates to an improved harrow for pulverizing the soil, and is designed as an improvement on Letters Patent granted to me July 6, 1886, and numbered 345,214, and is illustrated in the accompanying drawings, in which—

Figure 1:
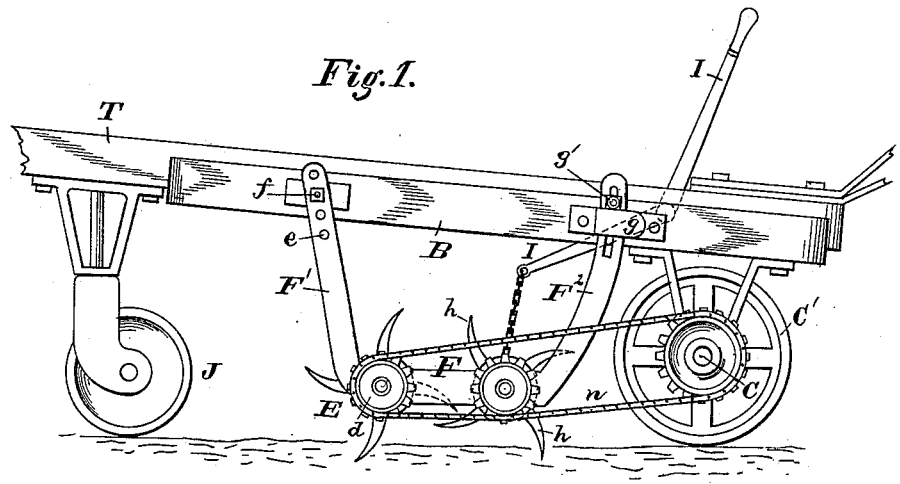
Figure 2:
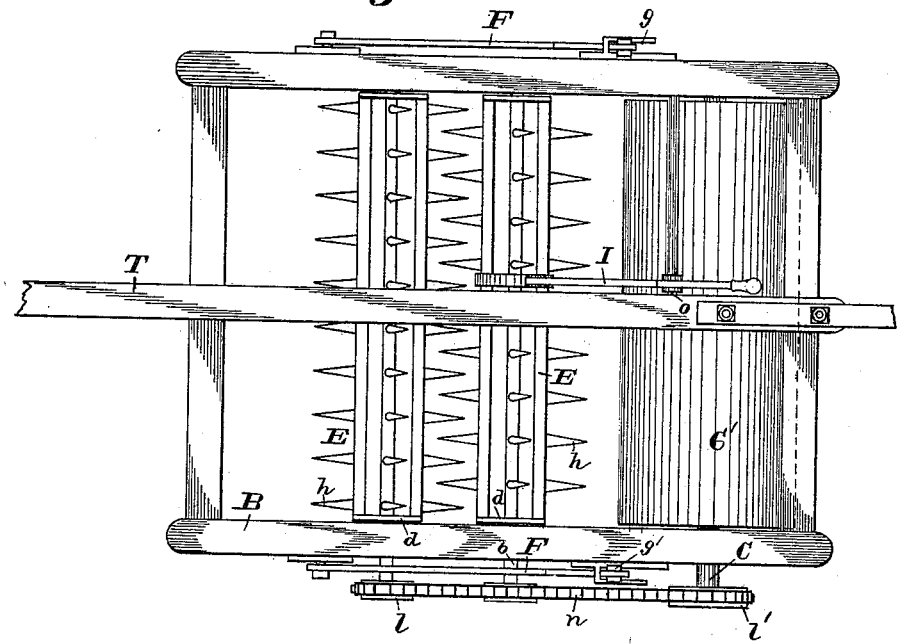
Figure 3:
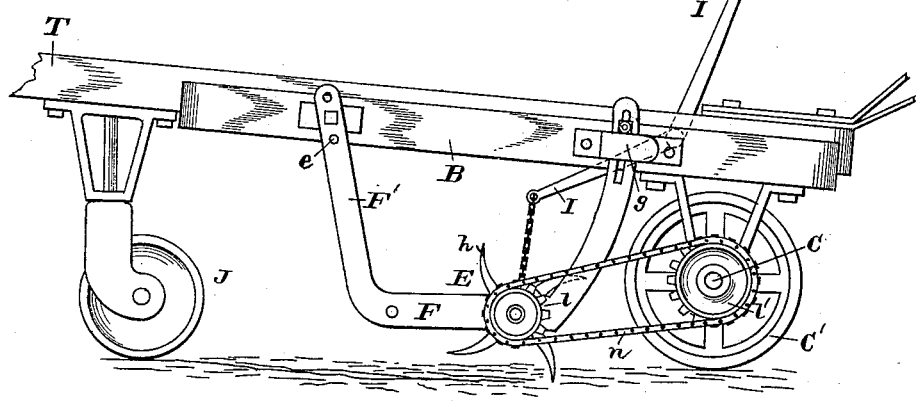
Figure 4:
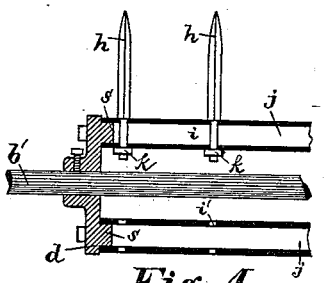
Figure 5:
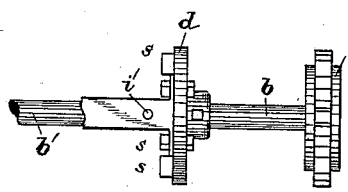
Figure 6:
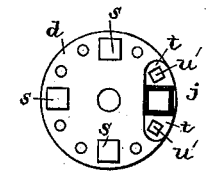
Figure 7:
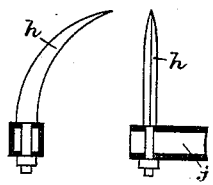
Figure 8:
Figure 9:
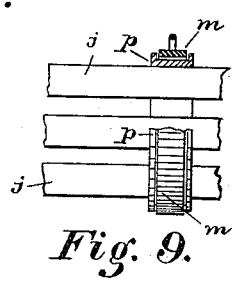
Figure 10:
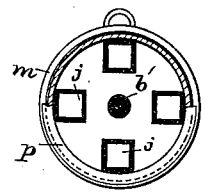

Figure 1 is a side view of the harrow, showing two driven cylinders. Fig. 2 is a top or plan view. Fig. 3 is a side view of the harrow, showing one driven cylinder. Fig. 4 is a section view of one end of a power-driven cylinder. Fig. 5 is a side view showing part of the other end of the power-driven cylinder. Fig. 6 is an inner side view of one of the disks which form the ends of the cylinder. Fig. 7 shows two views of the harrow-tooth attached to the cylinder-bar. Fig. 8 shows two views of one of the cylinder-bars. Figs. 9 and 10 show two views of part of the power-driven cylinder.

The letter B designates the frame, C the axle, and C' a land-roller rigidly fixed on the said axle and supporting the rear of the frame. A draft-pole, T, is attached, and a caster-wheel, J, supports the front of the frame. I combine with this frame an adjustable harrow-frame, F F' F², a harrow-cylinder, E, and drive-gearing $n$, connecting the said land-roller C' and the harrow-cylinder E, whereby a double result is obtained—to wit, the harrow-cylinder is driven by power or has a positive motion imparted to it and may be raised or lowered to any desired position.

The harrow-frame comprises two irons—one at each side of the machine. Each iron has a horizontal or lower part, F, an upward-projecting front arm, F', and an upward-projecting rear arm, F². The front arm, F', has pivot-holes $e$, and a bolt, $f$, through one of said holes into the frame B serves as a pivot for the harrow-frame. The rear arm, F², loosely occupies a keeper, $g$, on the side of the frame, and thereby the rear part of the harrow-frame is free to be raised or lowered. The rear arm, F², has a slot, and an adjustable bolt, $g'$, serves as a stop to regulate the depth to which the blades or prongs $h$ of the harrow may penetrate the soil.

A rotary harrow consists of a cylinder, E, having journals $b$ mounted in the harrow-frame, and provided with blades or prongs $h$ to cut the soil. This cylinder may be made in various ways, as will be readily understood. It may consist of a solid or a hollow drum. The construction shown in the drawings comprises two circular heads, $d$, which are mounted and rigidly secured on a shaft, $b'$, the ends of which outside of the disks form the journals $b$. Bars $j$ connect the two circular heads and may be attached thereto in any suitable manner. In the present instance four bars are used, though any other number may be employed. The blades or prongs $h$, which may be of any desired shape, have a shank, $i$, which passes through holes $i'$ in the bars $j$, and a nut, $k$, on the shank secures the blades. In the present instance the circular heads $d$ have on one side square lugs $s$, and the bars $j$ are tubular or hollow and square, and the ends of the bars set over the said square lugs. Each end of the bar has two flanges, $t$, with bolt-holes $u$, and bolts $u'$ pass through the said holes and through the head.

A sprocket-wheel, $l$, is fixed on the end of the cylinder-shaft $b'$. Another sprocket-wheel, $l'$, is on the end of the axle C of the land-roller, and a drive-chain, $n$, connects the said two sprocket-wheels, and by this gearing the rotary harrow is driven or has a positive motion imparted to it and will be rotated and may be adjusted to any vertical position.

A grooved band, $p$, surrounds the four bars $j$ of the cylinder and is attached to them, (see Figs. 9 and 10,) and a collar, $m$, fits in the groove of said band and loosely surrounds it. A lever, I, is pivoted at $o$ to the frame or to the tongue. One end of the lever I is connected by a chain or other suitable link with the collar $m$, thereby the driver by pulling or depressing the lever may raise the rotary harrow and frame.

Two rotary harrows may be used, as shown in Figs. 1 and 2, or one may be used alone, as shown in Fig. 3. Where two are used, the blades will intermesh, so as to keep each other clear. If desired, a prong or blade cleaner may be used like that shown in my patent, No. 345,214, dated July 6, 1886.

Instead of the land-roller C', ordinary wheels may be used on the axle C. The combination would be the same.

Having described my invention, I claim and desire to secure by Letters Patent of the United States—

The combination, with the main frame having at one end the roller C', the tongue T, carrying the wheel J of the harrow-frame, located between the roller and wheel, said harrow-frame consisting of the pivoted adjustable arms F' and slotted adjustable curved arms F², the intermediate arms F, connected to arms F' and F² and provided with journals for the harrow, the chain $n$, connecting sprocket-wheels of the harrow and roller, and the sectional lever I, substantially as shown and described.

In testimony whereof I affix my signature in the presence of two witnesses.

THOMAS R. CRANE.

Witnesses:
JOHN E. MORRIS,
JNO. T. MADDOX.